(12) United States Patent
Surmann et al.

(10) Patent No.: US 9,357,697 B2
(45) Date of Patent: Jun. 7, 2016

(54) CUTTING DEVICE FOR AGRICULTURAL MACHINES

(71) Applicant: Carl Geringhoff GmbH & Co. KG, Ahlen (DE)

(72) Inventors: Klemens Surmann, Ahlen (DE); Dirk Webermann, Senden (DE); Michael Pokriefke, Hude (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 0 days.

(21) Appl. No.: 14/656,972

(22) Filed: Mar. 13, 2015

(65) Prior Publication Data
US 2015/0305233 A1    Oct. 29, 2015

(30) Foreign Application Priority Data
Mar. 14, 2014    (DE) .......................... 10 2014 003 493

(51) Int. Cl.
| | | |
|---|---|---|
| *A01D 34/13* | (2006.01) | |
| *A01D 34/14* | (2006.01) | |
| *A01D 34/135* | (2006.01) | |
| *A01D 34/30* | (2006.01) | |

(52) U.S. Cl.
CPC .............. *A01D 34/14* (2013.01); *A01D 34/135* (2013.01); *A01D 34/145* (2013.01); *A01D 34/30* (2013.01)

(58) Field of Classification Search
CPC ..... A01D 34/13; A01D 34/136; A01D 34/17; A01D 34/18; A01D 34/14; A01D 34/02; A01D 34/16; A01D 34/30
USPC ............ 56/296, 298, 293, 297, 301, 257, 259
See application file for complete search history.

(56) References Cited

U.S. PATENT DOCUMENTS

| | | | | |
|---|---|---|---|---|
| 497,320 | A * | 5/1893 | Hillabold ............... | A01D 34/13 56/301 |
| 540,623 | A * | 6/1895 | Ball et al. ............... | A01D 34/13 56/301 |
| 1,647,867 | A * | 11/1927 | Hutsell .................. | A01D 34/02 33/1 A |
| 3,151,434 | A * | 10/1964 | Hamel ................... | A01D 34/13 56/296 |
| 3,763,638 | A * | 10/1973 | Vogelenzang ......... | A01D 34/30 56/293 |

(Continued)

FOREIGN PATENT DOCUMENTS

| | | | | |
|---|---|---|---|---|
| CA | 2836427 A1 * | 8/2014 | ............. | A01D 34/17 |
| DE | 195 24 039 A1 | 1/1997 | | |

*Primary Examiner* — Árpád Fábián-Kovács
(74) *Attorney, Agent, or Firm* — Gudrun E. Huckett

(57) ABSTRACT

An agricultural cutting device has knife bar sections with section knife blades. A drive with phase offset drives the knife bar sections at least temporarily in opposite directions. The section knife blades interact scissor-like with counter knives. The knife bar sections have adjacently positioned bar ends. When the knife bar sections move, a gap of varying size is formed between the bar ends. A mowing finger is arranged at the gap. A stationary knife blade with first cutting edges is arranged at the mowing finger. The first cutting edges are arranged adjacent to the mowing finger and extend at a slant relative to a forward travel direction of the cutting device so that the cutting edges have a V-shaped arrangement broadening in travel direction. The knife bar sections have an outer knife blade attached to the bar ends whose cutting edges extend parallel to the travel direction.

6 Claims, 3 Drawing Sheets

(56) References Cited

U.S. PATENT DOCUMENTS

| | | | | |
|---|---|---|---|---|
| 3,978,645 A * | 9/1976 | Bennett | A01D 34/18 | 56/310 |
| 4,380,889 A * | 4/1983 | Isbell | A01D 34/13 | 56/296 |
| 4,901,512 A * | 2/1990 | Castoldi | A01D 34/13 | 56/293 |
| RE33,546 E * | 3/1991 | O'Halloran | A01D 34/17 | 56/296 |
| 6,062,012 A * | 5/2000 | Suarez | A01D 34/135 | 56/257 |
| 6,857,255 B1 * | 2/2005 | Wilkey | A01D 34/13 | 56/296 |
| 6,886,317 B2 * | 5/2005 | Jackson | A01D 34/13 | 56/296 |
| 7,313,903 B2 * | 1/2008 | Schumacher | A01D 34/16 | 56/304 |
| 7,328,565 B2 * | 2/2008 | Snider | A01D 34/135 | 56/298 |
| 8,893,462 B2 * | 11/2014 | Talbot | A01D 34/13 | 56/298 |
| 2002/0035827 A1 * | 3/2002 | Yang | A01D 34/13 | 56/298 |
| 2004/0216440 A1 * | 11/2004 | Talbot | A01D 34/135 | 56/296 |
| 2005/0028505 A1 * | 2/2005 | Schumacher | A01D 34/14 | 56/296 |
| 2011/0126503 A1 * | 6/2011 | Thurlow | A01D 34/17 | 56/298 |

* cited by examiner

CUTTING DEVICE FOR AGRICULTURAL MACHINES

BACKGROUND OF THE INVENTION

The present invention relates to a cutting device for agricultural machines with several knife bar sections, which are driven so that they are at least temporarily movable in opposite directions and which extend over the working width of the cutting device, the knife blades of which, at the time of a stroke movement of the knife bar sections, interact in a scissor-like manner with counter knives attached fixedly to the cutting device.

A cutting device of the aforementioned kind is known from DE 195 24 039 A1. These cutting devices can be used in particular with cutting assemblies for combine harvesters, but also in mowers for grass or for harvesting other agricultural stalk material.

In DE 195 24 039 A1, it is disclosed to subdivide a cutting device into at least two cutting device portions in order to prevent vibrations and to avoid losses due to shaking. As a result of a phase shift of the driving frequency by 180°, the vibration generated by one cutting device portion is supposed to be compensated by the other cutting device portion and, at best, eliminated. This results in the cutting device portions moving in opposite directions transversely to the working direction of the cutting device. In the case of a movement in opposite directions of the cutting device portions relative to one another, where said portions move apart from one another, a gap forms between them, which becomes larger in the course of the movement and which gradually closes only after the two external dead centers have been reached in the subsequent backward movement and which is closed only for a short time when the two cutting device portions have reached their internal dead center. In the case of a phase shift by a value other than 180° the gap is closed only for a brief amount of time, alternatingly asymmetrically on the right and on the left. In the case of forward travel with the cutting device into an upright crop stand, an unmown strip forms in the area of the gap and constitutes an undesirable crop loss.

The object of the present invention is to keep the width of the unmown strip as small as possible or to prevent it entirely.

SUMMARY OF THE INVENTION

The object is solved for a cutting device of the aforementioned kind by arranging a mowing finger in the area of a gap which forms in the area of the mutually facing bar ends of adjacent knife bar sections as a result of the movement of the knife bar sections and which becomes continuously smaller and larger again (alternatingly smaller and larger) in accordance with the movement of the knife bar sections, and next to said mowing finger, in a transverse direction, cutting edges of a stationary knife blade that is arranged fixedly in the area of this mowing finger are formed and extend at a slant relative to the forward travel direction of the cutting device so that the cutting edges of this stationary knife blade have a V-shaped arrangement which broadens toward the forward travel direction, and, on the outer end faces of the outer knife blades, which are attached to the mutually facing bar ends of adjacent knife bar sections, cutting edges are formed which extend parallel to the forward travel direction of the cutting device, wherein a drive of the adjacent knife bar sections has a phase offset in a range of from 80° to 100°.

When the cutting device is provided with a finger mowing bar in which the mowing fingers form the counter cutting edge and the section knife blades are guided in the finger bar so that they can move back and forth, the result is a clean cutting action of the stalk material to be harvested which consumes relatively little energy. A finger mowing bar is relatively insensitive to stones and other obstacles and requires little maintenance since there are only a few movable parts present. As a result of the mowing fingers attached to a finger mowing bar over the working width, it is possible, in particular, at the time of forward travel into the crop stand, to lift stalk material lying on the ground with the mowing fingers before it is cut. As a result, additional crop losses are avoided which is of great significance, particularly in the case of a crop that is to be cut close to the ground, such as soybeans, for example.

As a result of this combination of the arrangement of knife blades and the formation of the cutting edges present thereon, it is possible to bridge the gap, formed due to the movement of the knife bar sections and becoming smaller and again larger continuously in accordance with the movement of the knife bar sections, by means of the fixedly arranged knife blade. In this context, the cutting edges, arranged in the shape of a V, of the fixedly arranged knife blade interact in a scissor-like manner with the cutting edges of the outer knife blades attached to the mutually facing bar ends of adjacent knife bar sections during their stroke movement toward the mowing finger arranged in the area of the gap and, in this way, the stalks of the crop present in the area of the fixedly arranged knife blade are also reliably cut off. In this manner, an unmown strip in the area of the gap between the knife bar sections is prevented. In addition, the arrangement according to the invention also makes it possible, in the area of the gap and to the side thereof, to arrange mowing fingers which lift crops lying on the ground in the area of the gap and contribute to preventing crop losses by means of a reliable cutting action.

As a result of the phase offset in the drive action of the adjacent knife bar sections in an order of magnitude of from 80° to 100°, it is achieved that force peaks of the two knife bar sections occurring during the cutting of the stalk material occur with temporal offset, and the overall force required by the cutting device can therefore be kept comparatively low. In addition, in the case of a given width of the knife blades and a resulting distance of the mowing fingers from one another, geometric conditions are produced wherein the gap between the knife bars is not excessively large and can be bridged by the stationary knife blade whose width corresponds at least approximately, or exactly, to the width of the remaining section knife blades. In regard to a mechanical drive with rotating shafts, the indicated phase offset of 80° to 100° relates to a complete 360° rotation of the drive shaft; in the case of a hydraulic or electronic control, the phase offset can also be implemented by hydraulic or electronic means.

According to an embodiment of the invention, the mowing finger arranged in the area of the gap is connected to two additional mowing fingers at a distance from the former mowing finger, via a common attachment bar or fastening strip, and the lateral distance between the two additional mowing fingers and the mowing finger arranged in the area of the gap corresponds in each case at most to the width of a knife blade moving in this interstice. The triple mowing finger assembly formed in this manner forms a reliable guide for the mutually facing bar ends of the adjacent knife bar sections and the outer knife blades attached thereto during their stroke movements. As a result of the decrease in the distance between the mowing fingers to a value of at most one knife blade width, said mowing fingers can satisfactorily support a knife blade moving in this area. The outer knife blades of the knife bar sections are supported during the stroke movement by the mowing fingers, and in this way they can perform a clean cut. In addition, when the outer knife blades have to absorb lower torsion forces due to the improved support, the susceptibility to brittle fracture decreases and the stability of the outer knife blades increases.

According to an embodiment of the invention, the outer knife blades, which are attached to mutually facing bar ends of adjacent knife bar sections, in each case have a width which corresponds at least approximately to half the width of the remaining section knife blades attached to a knife bar section, and the stationary knife blade, which is arranged fixedly in the area of the mowing finger arranged in the area of the gap, has a width which corresponds at least approximately to the width of the remaining section knife blades attached to a knife bar section. As a result of the approximately halved width of the outer knife blades, a long straight cutting edge is obtained on the outer end face in case of an approximately trapezoidal base form of a whole knife blade; this long straight cutting edge interacts with the associated cutting edge at the knife blade arranged fixedly in the area of the mowing finger in order to cut stalk material, wherein the long cutting edge, in the course of a stroke movement, overlaps the entire associated cutting edge of the fixedly arranged stationary knife blade, and, at least in an end position, is covered by a mowing finger arranged in the area of the gap.

According to an embodiment of the invention, two adjacent knife bar sections are provided with a drive which drives the two knife bar sections with phase offset. The term phase offset refers to a drive action in which the knife bar sections are not movable at the same time in opposite directions or in the same direction. The drive action can be produced, for example, by one or more cranks, push rods, eccentric shafts, a hydraulic cylinder or an electric motor. The phase offset can be produced by appropriate mechanical devices and/or by means of electrical, electronic or hydraulic switching devices. Due to the phase offset, it is achieved that the peak load on the drive train, which occurs when a position of the knife blades relative to the mowing fingers, as counter cutting edges, is reached, always occurs only for one of two adjacent knife bar sections so that the peak load is halved and temporally offset by the phase offset for the respective knife bar section located in the corresponding position. As a result, the drive train can be relieved and designed to be more light weight.

According to an embodiment of the invention, two adjacent knife bar sections are driven by a rotating drive pulley whose rotation movement is transmitted via connecting rods, which are connected eccentrically and with phase offset to the drive pulley, to rocker arms, each movable about approximately centrally arranged swivel axles and connected at their ends facing away from the connection with the associated connecting rod to the respective associated knife bar section. The drive action of the two knife bar sections via a drive pulley establishes a good mechanical coupling and synchronization of the movements of the two knife bar sections. The drive can be designed in a manner that saves space and reduces weight, which is an important aspect in cutting systems.

According to an embodiment of the invention, the drive pulley and the connecting rods are mounted in a closed gear housing which is located on the lower side of the cutting device and behind the knife bar sections. As a result of the closed housing, the drive is maintenance-free. Due to the improved protection against soiling, the drive has a longer service life and is less susceptible to breakdown.

It is explicitly pointed out that the above described embodiments of the invention can in each case be combined individually, but also any desired combination among one another, with the subject matter of the independent claim.

Additional variants and modifications of the invention can be obtained from the following concrete description and the drawings.

BRIEF DESCRIPTION OF THE DRAWINGS

The invention will now be explained in further detail based on one embodiment.

DESCRIPTION OF PREFERRED EMBODIMENTS

Figure 1:
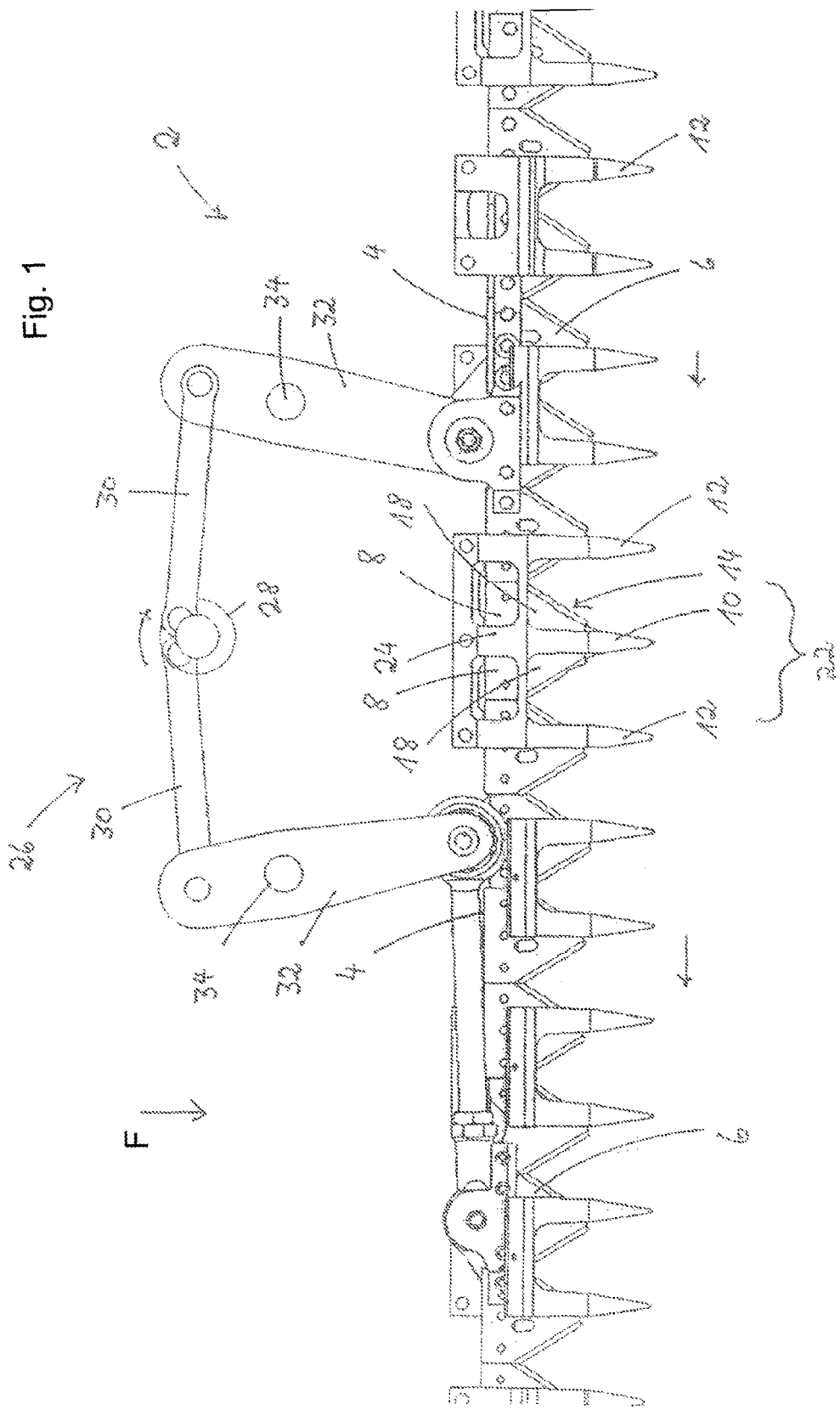
FIG. 1 illustrates a basic configuration of a cutting device, wherein only the central area of the knife bar sections connected to the drive is shown and it is understood that the knife bar sections have a length extending beyond the illustrated detail.

In FIG. 1, a basic configuration of a cutting device 2 is shown. In the embodiment, the cutting device has two knife bar sections 4 which are separated from one another in the central area of the drawing in the embodiment. In the swivel position in which the knife bar sections 4 are located in FIG. 1, the separation of the two knife bar sections 4 from one another is not visible since they are submerged with their mutually facing bar ends 8 and the outer knife blades 18 attached thereto in the central mowing finger 10. In addition to the central mowing finger 10, which is located in the area of a gap 22 resulting during a movement of the knife bar sections 4, the cutting device 2 has several additional mowing fingers 12, which function as counter cutting edges for the section knife blades 6 attached to the knife bar sections 4.

Beneath the mowing finger 10, a fixedly attached stationary knife blade 14 is located, which is covered in FIG. 1 by the outer knife blades 18. The stationary knife blade 14 has cutting edges 16 which extend at a slant relative to the forward travel direction F.

In the embodiment, the mowing finger 10 is connected via a fastening strip 24 to adjacent mowing fingers 12 so that the three mowing fingers 10, 12 form a triple mowing finger assembly. As a result of the supporting connection of the three mowing fingers via the fastening strip 24, the mowing finger 10 in particular is supported better against alternating stresses acting on it due to the movement of the two knife bar sections 4. The fastening strip 24 can be connected via screws, rivets or other fastening means to the cutting device 2.

In addition, an embodiment for a drive 26 is shown in FIG. 1. The drive 26 is based on a rotating drive pulley 28 to which two connecting rods 30 are connected eccentrically. The two connecting rods 30 are movably connected at their ends facing away from the drive pulley 28 to rocker arms 32. Upon rotation of the drive pulley 28, the connecting rods 30 push or pull the rocker arms 32 about the swivel axles 34 in accordance with the rotation position of the drive pulley 28 forward or backward in a transverse direction of the cutting device 2. In FIG. 1, the rotation movement of the drive pulley 28 is indicated by an arrow. The movement of the two knife bar sections 4, which is imparted via the connecting rods 30 and the rocker arms 32 onto the knife bar sections 4 by the drive pulley 28 that is rotating in the direction of the arrow, is indicated by short arrows. Since the right connecting rod 30 has not yet reached its outermost dead center in the rotation position depicted in FIG. 1, the right knife bar section 4 would still move a small distance towards the left in the case of an additional clockwise rotation of the drive pulley 28. In the case of a clockwise rotation of the drive pulley 28, the left connecting rod 30 would be pulled to the right so that the left knife bar section 4 also moves to the left.

Figure 2:
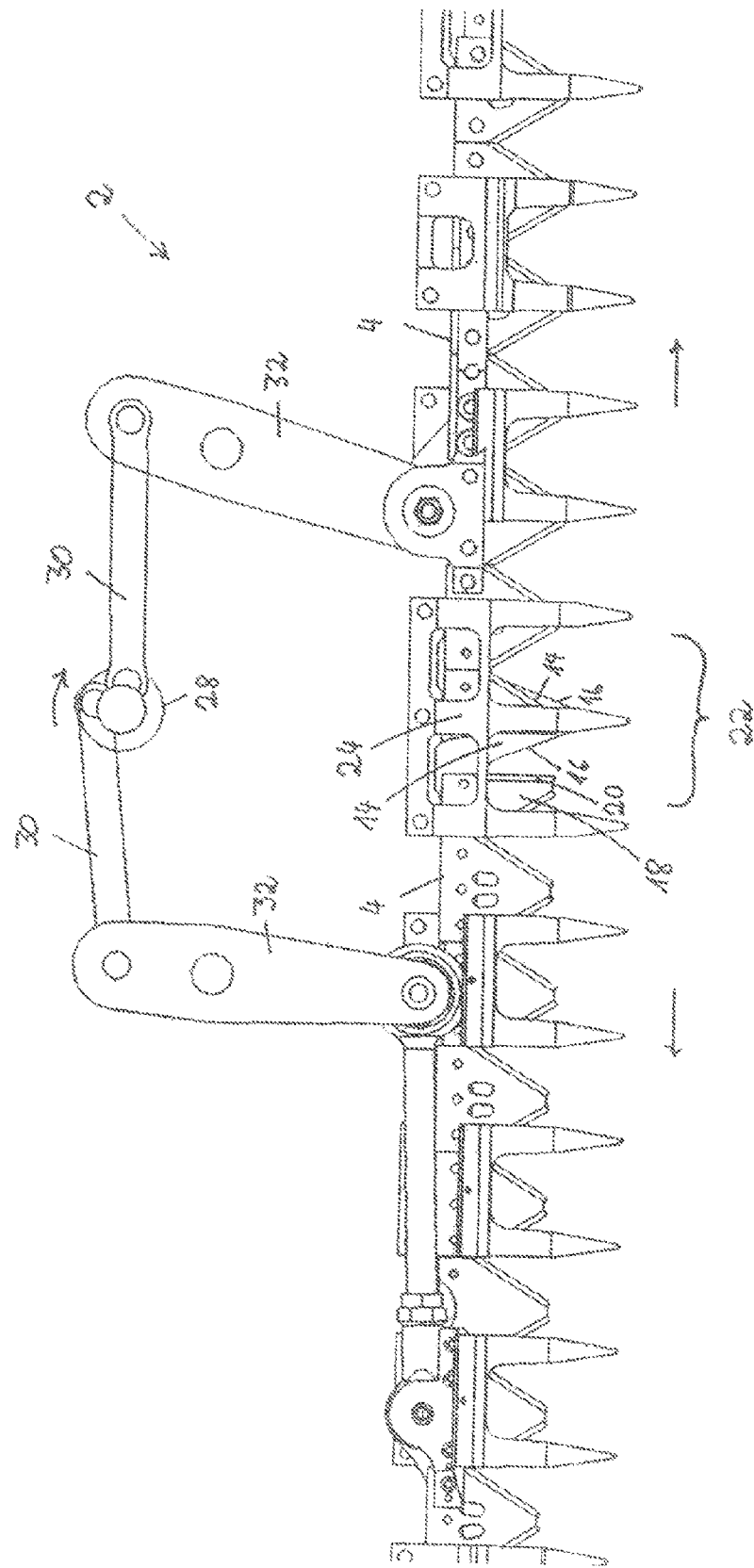
FIG. 2 shows the cutting device of FIG. 1 with a changed position of the knife bar sections.

FIG. 2 shows the cutting device 2 with a changed position of the knife bar sections 4. The drive pulley 28 has been rotated further by a small distance in comparison to the rotation position depicted in FIG. 1, as a result of which the right connecting rod 30 has reached its right dead center in the transverse direction. In the case of an additional clockwise rotation of the drive pulley 28, the right knife bar section 4 would move to the right, induced by the rotation movement transferred via the connecting rod 30 and the rocker arm 32. In the case of a continued clockwise rotation movement of the drive pulley 28, the left connecting rod 30 would be pulled farther to the right from the position shown in FIG. 2 so that the left rocker arm 32 moves the left knife bar section 4 to the left.

In the rotation position of the drive pulley 28 shown in FIG. 2, one can easily see that the outer knife blade 18 of the left knife bar section 4 has been moved away from the mowing finger 10 located in the area of the gap 22. The left outer knife blade 18, on its end face, has a cutting edge 20, which, at the time of a movement of the outer knife blade 18 toward the mowing finger 10, interacts with the cutting edge 16 located on the stationary knife blade 14 in order to cut off the stalk material located in this area of the cutting device 2. As the outer knife blade 18 travels across the stationary knife blade 14, a scissor-like cutting action results.

Since the outer knife blade 18 of the right knife bar section 4 is still located in the area of the mowing finger 10, the cutting edge 20 located on this outer knife blade 18 is still not visible in FIG. 2. However, in this swivel position of the right knife bar section 4, one can see the cutting edge 16 of the stationary knife blade 14 located thereat.

Figure 3:
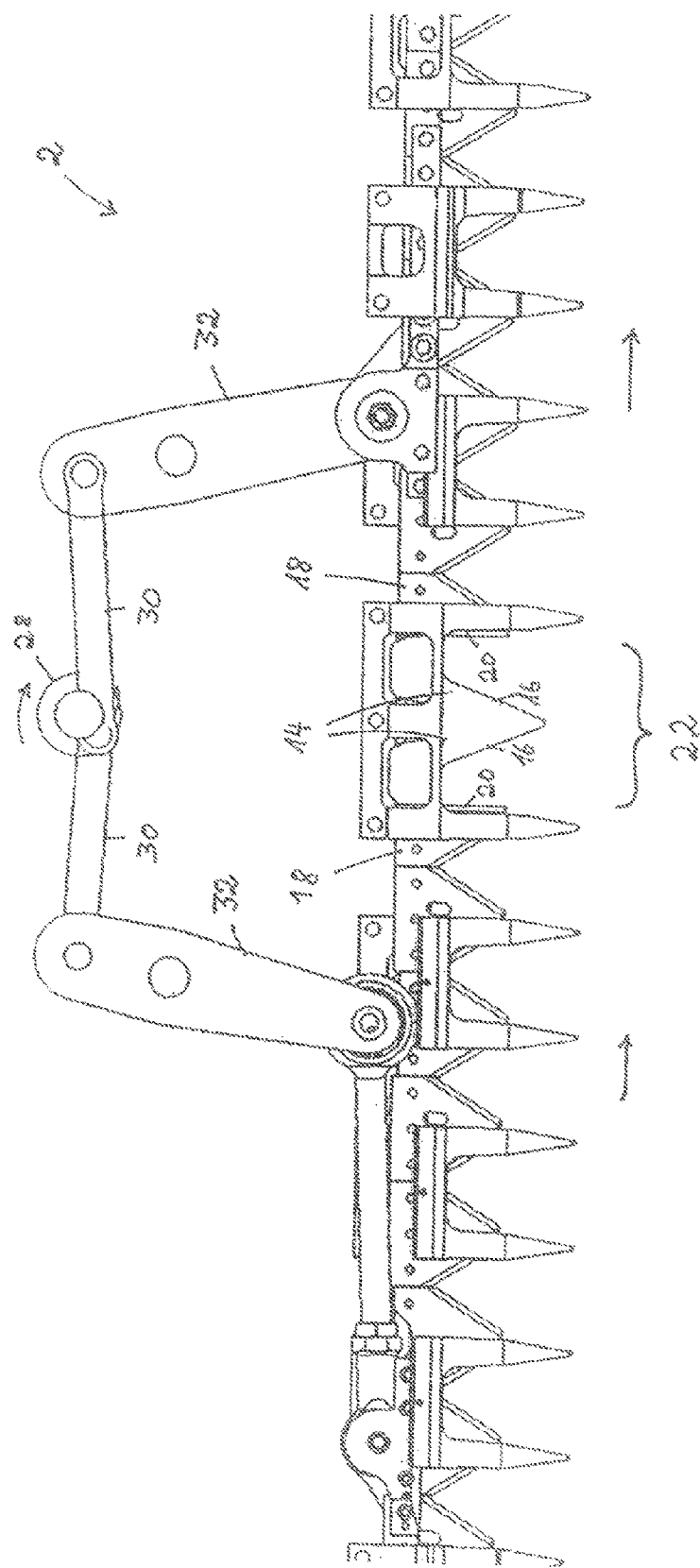
FIG. 3 shows the cutting device of FIG. 1 with another changed position of the knife bar sections.

In FIG. 3, the two knife bar sections 4 are shown close to their outermost dead center so that the gap 22 between the two outer knife blades 18 can be seen easily. Upon continued clockwise rotation of the drive pulley 28, the left knife bar section 4 is already moved again in the direction of the mowing finger 10 while the right knife bar section 4 continues to move a small distance away from the mowing finger 10 before it starts to return again. In order to be able to better illustrate the stationary knife blade 14, the mowing finger 10 is not shown in FIG. 3. In FIG. 3, one can easily see that the stalk material located in the area of the gap 22 between the cutting edges 16 and 20 of the stationary knife blade 14 and the two outer knife blades 18 is reliably cut at the time of the return movement of the two knife bar sections 4 toward the mowing finger 10.

The invention is not limited to the above embodiment. It is not difficult for a person skilled in the art to modify the embodiment in a manner that appears suitable to him in order to adapt it to a concrete application situation.

The specification incorporates by reference the entire disclosure of German priority document 10 2014 003 493.3 having a filing date of Mar. 14, 2014.

While specific embodiments of the invention have been shown and described in detail to illustrate the inventive principles, it will be understood that the invention may be embodied otherwise without departing from such principles.

What is claimed is:

1. A cutting device for agricultural machines, the cutting device comprising:
    knife bar sections extending across a working width of the cutting device and comprising section knife blades;
    a drive connected to the knife bar sections and driving the knife bar sections so that the knife bar sections are at least temporarily movable in opposite directions, wherein the drive has a phase offset in a range of from 80 to 100°;
    fixedly mounted counter knives;
    the section knife blades, when the knife bar sections perform a stroke movement, interacting in a scissor-like manner with the counter knives;
    the knife bar sections each comprising a bar end, the bar ends facing each other and positioned adjacent to each other;
    wherein, as a result of the knife bar sections being moved by the drive to perform the stroke movement, a gap is formed between the bar ends and the gap becomes alternatingly smaller and larger continuously in accordance with the stroke movement of the knife bar sections;
    a first mowing finger arranged in the area of the gap;
    a stationary knife blade arranged fixedly in the area of the mowing finger and provided with first cutting edges that are arranged, in a transverse direction, adjacent to the first mowing finger, wherein the first cutting edges extend at a slant relative to a forward travel direction of the cutting device so that the cutting edges have a V-shaped arrangement which broadens in the forward travel direction;
    the knife bar sections each comprise an outer knife blade attached to the bar ends, respectively, wherein the outer knife blades comprise second cutting edges that extend parallel to the forward travel direction of the cutting device.

2. The cutting device according to claim 1, comprising two second mowing fingers arranged at a lateral distance relative to the first mowing finger, respectively, wherein the first mowing finger is connected to the two second mowing fingers by a common fastening strip, and the lateral distance between the two second mowing fingers and the first mowing finger, respectively, corresponds at least to a width of the outer knife blades.

3. The cutting device according to claim 2, wherein the outer knife blades each have a width which corresponds approximately to half a width of the section knife blades, and the stationary knife blade has a width which corresponds at least approximately to the width of the section knife blades.

4. The cutting device according to claim 1, wherein the drive drives two of said knife bar sections with phase offset.

5. The cutting device according to claim 4, wherein the drive comprises a drive pulley and first and second connecting rods connected eccentrically and with phase offset to the drive pulley, wherein the drive further comprises first and second rocker arms each movable about a swivel axle arranged approximately centrally on the first and second rocker arms, respectively, wherein the first and second rocker arms each comprise a first end connected to the first and second connecting rods, respectively, and a second end facing away from the first and second connecting rods, respectively, wherein the second ends are connected to one of the knife bar sections, respectively, wherein a rotation movement of the drive pulley is transmitted by the first and second connecting rods onto the first and second rocker arms, respectively.

6. The cutting device according to claim 5, further comprising a closed gear housing arranged on a lower side of the cutting device and behind the knife bar sections, wherein the drive pulley and the first and second connecting rods are mounted in the closed gear housing.

* * * * *